(12) United States Patent
Kissell (10) Patent No.: US 7,003,630 B1
(45) Date of Patent: Feb. 21, 2006

(54) MECHANISM FOR PROXY MANAGEMENT OF MULTIPROCESSOR STORAGE HIERARCHIES

(75) Inventor: Kevin D. Kissell, Le Bar sur Loup (FR)

(73) Assignee: MIPS Technologies, Inc., Mountain View, CA (US)

(*) Notice: Subject to any disclaimer, the term of this patent is extended or adjusted under 35 U.S.C. 154(b) by 189 days.

(21) Appl. No.: 10/186,330

(22) Filed: Jun. 27, 2002

(51) Int. Cl.
*G06F 12/00* (2006.01)

(52) U.S. Cl. ............................... 711/141; 711/5; 711/6; 711/104; 711/118; 711/120; 711/154; 709/105; 709/107; 709/201; 709/203; 709/212; 709/213; 709/229

(58) Field of Classification Search .................. 711/5–6, 711/104–105, 111–148, 153–154, 203–207; 709/105, 107, 201–205, 212–213, 216, 218, 709/219–220, 227, 249, 312
See application file for complete search history.

(56) References Cited

U.S. PATENT DOCUMENTS

| | | | |
|---|---|---|---|
| 4,951,192 A | | 8/1990 | Chase, Jr. et al. |
| 4,951,193 A | * | 8/1990 | Muramatsu et al. ........ 711/206 |
| 5,022,004 A | | 6/1991 | Kurtze et al. |
| 5,450,607 A | | 9/1995 | Kowalczyk et al. |
| 5,623,628 A | * | 4/1997 | Brayton et al. ............. 711/141 |
| 5,754,818 A | | 5/1998 | Mohamed |
| 5,860,111 A | * | 1/1999 | Martinez et al. ............ 711/143 |
| 6,148,379 A | | 11/2000 | Schimmel |
| 6,223,274 B1 | * | 4/2001 | Catthoor et al. ............... 712/34 |
| 6,266,753 B1 | | 7/2001 | Hicok et al. |
| 6,298,418 B1 | * | 10/2001 | Fujiwara et al. ............ 711/144 |
| 6,480,876 B1 | | 11/2002 | Rehg et al. |
| 6,684,305 B1 | * | 1/2004 | Deneau ....................... 711/159 |
| 2002/0007427 A1 | * | 1/2002 | Forin .......................... 710/26 |
| 2002/0062434 A1 | * | 5/2002 | Chauvel et al. ............. 711/207 |

OTHER PUBLICATIONS

Feldmann et al., Mar. 1999, IEEE, vol. 1, pp.: 107–116.*
Max Baron, Intrinsity Arrays 2GHz Adaptive Matrix, Microprocessor Report, EPF 2002 Presentation Introduces Fast-Math, May 2002.
G. Michael Ulher et al, COMPAQ Digital Technical Journal, vol. 4, No. 3, Summer 1992.

(Continued)

*Primary Examiner*—Donald Sparks
*Assistant Examiner*—Hashem Farrokh
(74) *Attorney, Agent, or Firm*—James F. Kvrkowski; James W. Huffman (57) ABSTRACT

A method and apparatus within a processing environment is provided for proxy management of a plurality of proxy caches connected to a plurality of processing elements or cores within a unified memory environment. The proxy management system includes a proxy processor, such as a RISC core, that monitors data transfers or ownership transfers between the processing elements. If the proxy processor determines that a data transfer in one of the proxy caches will affect the coherency within another proxy cache, the proxy processor executes proxy management instructions such as invalidate, flush, prefetch to the appropriate proxy caches to insure coherency between the proxy caches and the unified memory.

36 Claims, 6 Drawing Sheets

OTHER PUBLICATIONS

Joel M. Tendler et al, IBM E Server, Power4 System Microarchitecture, Technical White Paper, Oct. 2001 pp. 1-33.

Kai Li et al. "Memory Coherence in Shared Virtual Memory Systems." ACM Transactions on Computer Systems. vol. 7, No. 4 Nov. 1989. pp. 321-359.

Kai Li et al. "Memory Coherence in Shared Virtual Memory Systems." ACM 1986 pp. 229-239.

Jack Browne. Statement of Recollection. Sep. 21, 2005.

Max Baron. *Intrinsity Arrays 2GHz Adaptive Matrix*. Microprocessor Report, EPF 2002 Presentation Introduces Fast-Math, May 2002.

Crowell, Jonathan C. et al "Design of the VAX 4000 Model 400, 500 and 600 Systems." *Digital Technical Journal* vol. 4, No. 3 Summer 1992.

Uhler, G. Michael et al "The NVAX and NVAX+ High-performance VAX Microprocessors." *Digital Technical Journal* vol. 4 No. 3 Summer 1992.

Anderson, Walker "Logical Verification of the NVAX CPU Chip Design." *Digital Technical Journal* vol. 4, No.3 Summer 1992.

Crowell, Jonathan C. et al "The Design of the VAX 4000 Model 100 and Micro VAX 3100 Model 90 Desktop Systems." *Digital Technical Journal* vol. 4, No. 3 Summer 1992.

Donchin, Dale R. et al "The NVAX CPU Chip: Design Challenges, Methods and CAD Tools." *Digital Technical Journal* vol. 4, No. 3 Summer 1992.

Chisvin, Lawrence et al "The VAX 6000 Model 600 Processor." *Digital Technical Journal* vol. 4, No. 3 Summer 1992.

Callander, Sr. Michael A. et al "Tje VAXstation 4000 Model 90." *Digital Technical Journal* vol. 4, No. 3 Summer 1992.

Porter, Brian "VAX 6000 Error Handling: A Pragmatic Approach." *Digital Technical Journal* vol. 4, No. 3 Summer 1992.

Becker, Mike *Multi-GHz Processors for Embedded Systems* Intrinsity Embedded Processor Forum. Apr. 30, 2002.

* cited by examiner

MECHANISM FOR PROXY MANAGEMENT OF MULTIPROCESSOR STORAGE HIERARCHIES

CROSS REFERENCE TO RELATED APPLICATIONS

This application is related to U.S. patent application Ser. No. 10/186,290 entitled "MECHANISM FOR PROXY MANAGEMENT OF MULTIPROCESSOR VIRTUAL MEMORY", by Kevin D. Kissell, and filed on the same date as the present application.

FIELD OF THE INVENTION

This invention relates in general to the field of computer architecture, and more specifically to a method and apparatus for proxy management of memory hierarchies within a system-on-chip (SoC) environment.

BACKGROUND OF THE INVENTION

Embedded microprocessor based systems typically include a number of components including: a microprocessor for executing instructions; read-only memory (ROM) for storing instructions; random-access memory (RAM) for storing instructions and data; as well as an interface to various input/output (I/O) devices such as a display, keyboard, serial connector, Ethernet, etc. An example of such an embedded system is shown in FIG. 1 to which attention is now directed.

Figure 1:
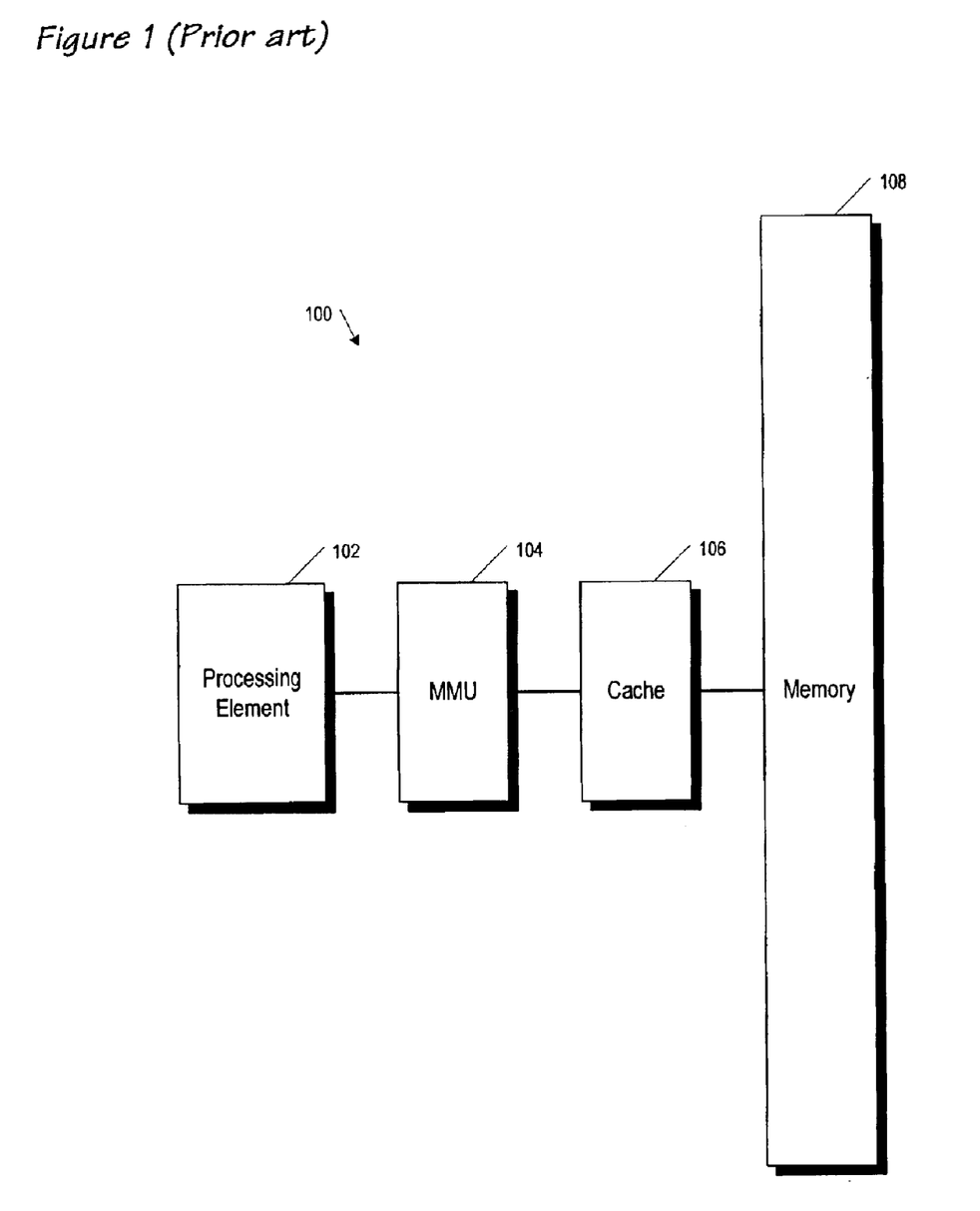
FIG. 1 is a block diagram of a prior art processing system.

FIG. 1 contains a block diagram 100 illustrating a processing element 102 coupled to a memory management unit (MMU) 104. The memory management unit 104 is coupled to a cache 106 which is coupled to a memory 108. In operation, the processing element 102 presents an address for instructions (or data) that is to be read from the memory 108 to the cache 106. If the cache 106 contains the instructions/data at the presented address, the instructions/data are provided to the processing element 102 without interfacing to the memory 108. However, if the cache 106 does not contain the instructions/data at the presented address, the address is provided to the memory 108 for retrieval of the instructions/data. One skilled in the art will appreciate that the MMU 104 translates a virtual address provided by the processing element 102 into a physical address for the cache 106 (for a physically tagged cache) and for the memory 108.

Figure 2:
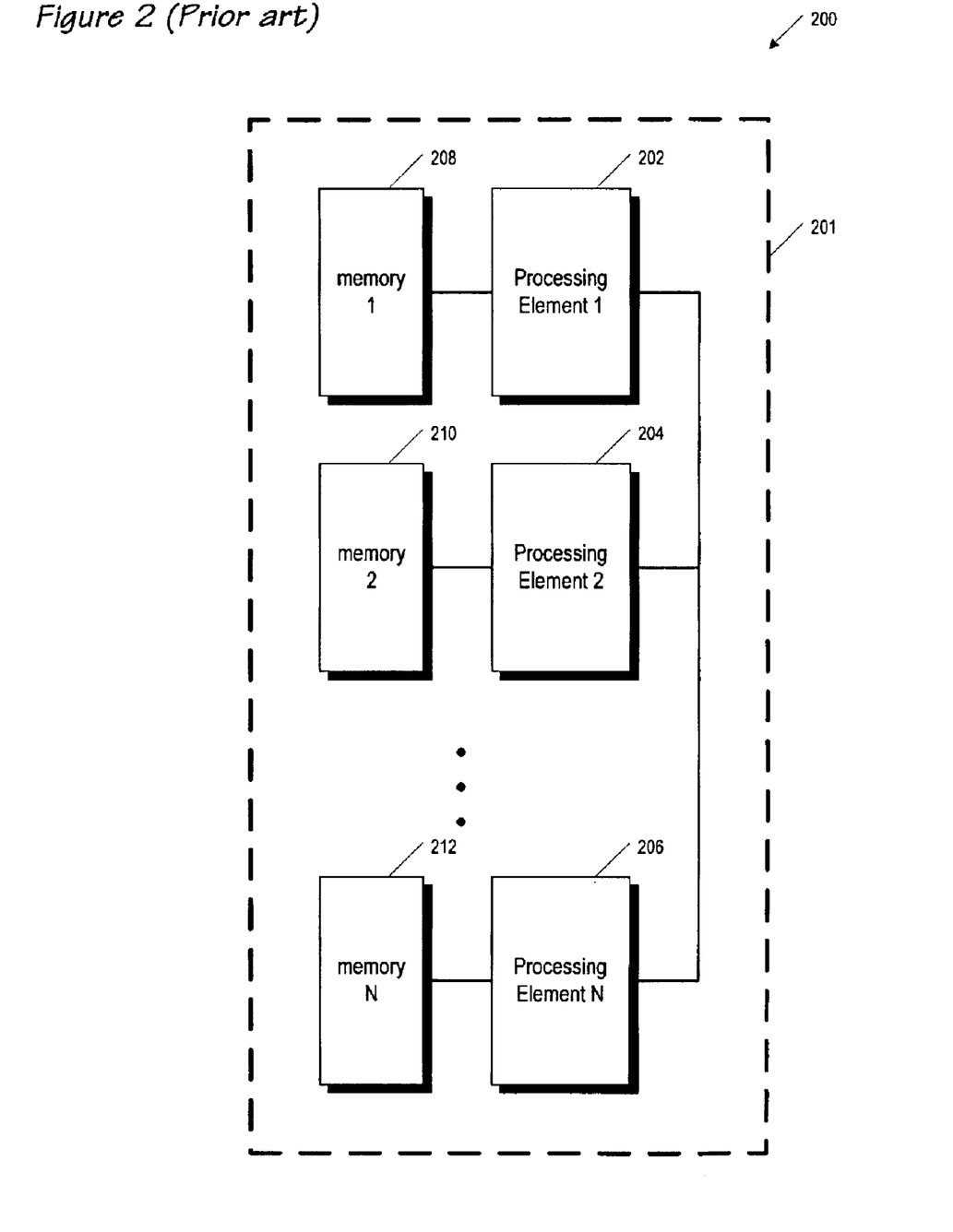
FIG. 2 is a block diagram of a prior art multi-processing system-on-a-chip (SoC).

More complex systems often contain multiple microprocessors (e.g., digital signal processors, graphics processors, etc.), each with their own memory systems, and often of different architecture (i.e., executing different instruction sets). Referring to FIG. 2 a block diagram 200 is shown having N number of processing elements 202, 204 and 206, each with their own memory system 208, 210, and 212, respectively. Early multiprocessor systems, such as is shown in FIG. 2, were implemented using different chips, mounted on a printed circuit board, and interconnected with signal lines on the printed circuit board. However, modern implementations are moving towards providing an entire system on a chip (SoC), as designated by dashed line 201. That is, a design engineer utilizes existing processing cores (elements), and existing memory structures to design multiprocessor SoC's for particular applications. Such SoC's allow for miniaturization of multiprocessing systems, and thus provide a lower cost alternative to the multi-chip, printed circuit board designs.

As shown in FIG. 2, when a SoC design requires multiple processing elements, of the same or different architecture, existing designs have chosen to support such processing elements by providing separate memory systems, and I/O device maps for each processing element. But, as the number of processing elements increases, so has the number of independent memory systems. However, the proliferation of independent memory systems is probably not the most economical solution. Multiple, large memory systems being accessed in parallel consume undesirable amounts of current. In addition, when providing independent memory systems for each processing element, the amount of memory that must be provided is the sum of the maximum runtime needs of each processing element. Memory in SoC's takes up considerable space oh the chips, and thus adds to the cost of manufacture, as well as runtime cost of the chips.

Therefore, what is needed is a memory management system for SoC's that allows a unified memory system to be utilized by multiple processing elements using a virtual memory system.

SUMMARY

The present invention provides a method and apparatus for proxy management of intermediate caches between processing elements and a unified memory where the processing elements may be homogeneous or heterogeneous.

In one aspect, the present invention provides an apparatus for proxy management of intermediate memories associated with processing elements, the processing elements sharing a unified memory. The apparatus includes a proxy processor and a cache. The proxy processor is coupled to the intermediate memories to execute proxy management instructions to manage the intermediate memories. The cache is coupled to the proxy processor, to store the proxy management instructions. The proxy processor monitors memory use among the processing elements, and executes proxy management instructions to effect transparency between the processing elements and the unified memory.

In another aspect, the present invention provides a proxy management system within a computing environment, the environment having processing elements. The proxy management system includes proxy caches and a proxy processor. The proxy caches are coupled to an associated one of the processing elements, to store instructions/data for use by the processing elements. The proxy processor is coupled to each of the proxy caches to manage coherency between the proxy caches. If the proxy processor determines that one of the proxy caches requires management, the proxy processor transmits proxy management instructions to the proxy cache.

In a further aspect, the present invention provides a proxy management method to allow processing elements to utilize generic caches between processing elements and a unified memory. The method includes: providing a proxy processor for interfacing to each of the generic caches; monitoring ownership transfers generated by the processing elements; determining whether any of the ownership transfers are directed to an address that is stored in one or more of the generic caches; and if so, transmitting proxy management instructions from the proxy processor to the one or more of the generic caches to insure coherency between the generic caches.

In a further aspect, the present invention provides a computer program product for use with a computing device, the computer program product including: a computer usable medium, having computer readable program code embodied in the medium, for causing a proxy management system to be described, the proxy management system having intermediate memories associated with processing elements, the processing elements sharing a unified memory. The computer readable program code includes: first program code for providing a proxy processor for executing proxy management instructions to manage the intermediate memories; and second program code for providing a cache for storing the proxy management instructions. The proxy processor monitors ownership transfers from the processing elements, and executes the proxy management instructions to the intermediate memories to effect coherency between the processing intermediate memories and the unified memory.

In another aspect, the present invention provides a computer data signal embodied in a transmission medium including computer-readable program code for providing a proxy management system within a system-on-a-chip (SoC) environment, the SoC having processing elements, each of the processing elements associated with at least one of a number of proxy caches between a unified memory and the plurality of processing elements. The program code includes: first program code for providing a proxy processor, coupled to the proxy caches, for proxy management of data within any of the proxy caches; and second program code for providing a cache, coupled to the proxy processor, for storing proxy management instructions. The proxy processor examines the cache to determine whether data within any of the plurality of proxy caches requires management, and if it does, it executes proxy management instructions to insure coherency of data within said plurality of caches.

Other features and advantages of the present invention will become apparent upon study of the remaining portions of the specification and drawings.

DETAILED DESCRIPTION

The inventor of the present application has recognized the need for utilizing a unified memory structure for processing elements within a SoC design where the processing elements may be homogeneous or heterogeneous. He has therefore developed a proxy memory management system as will be further described below with respect to FIGS. 3–8.

The phrase "proxy storage management" refers to the use of hardware and software, executing on a proxy processor to implement a SoC-wide hierarchical memory system transparently on behalf of other processing elements. In one embodiment, the inventor has utilized a MIPS RISC core, from MIPS Technologies, Inc., Mountain View, Calif., although other cores are envisioned. Proxy storage management includes both cache management and virtual memory management.

Cache Management

Sharing common RAM and ROM resources across multiple processing elements reduces the bandwidth available to each processing element and generally increases the memory latency between a processing element and memory. The increased latency is adverse to performance and is often intolerable. Therefore, existing multiprocessor systems typically utilize cache memories (or other intermediate memories) that are dedicated to each processing element to cache portions of the main memory and therefore improve the memory bandwidth and latency as seen by each processing element. However, in such multiprocessor systems, caches also create problems since it becomes possible for two different processing elements to believe that the same memory location contains two different values. In multi-chip, multiprocessing environments, sophisticated cache coherency mechanisms have been designed to insure data coherency across multiple caches. However, the processing elements in such systems are homogeneous (i.e., they execute the same instruction set), and must be designed to implement a particular coherency system. Because of this complexity, most existing SoC processing elements do not implement cache control at all, much less a mechanism to insure that the contents of the caches are coherent within a multiprocessor system.

Figure 3:
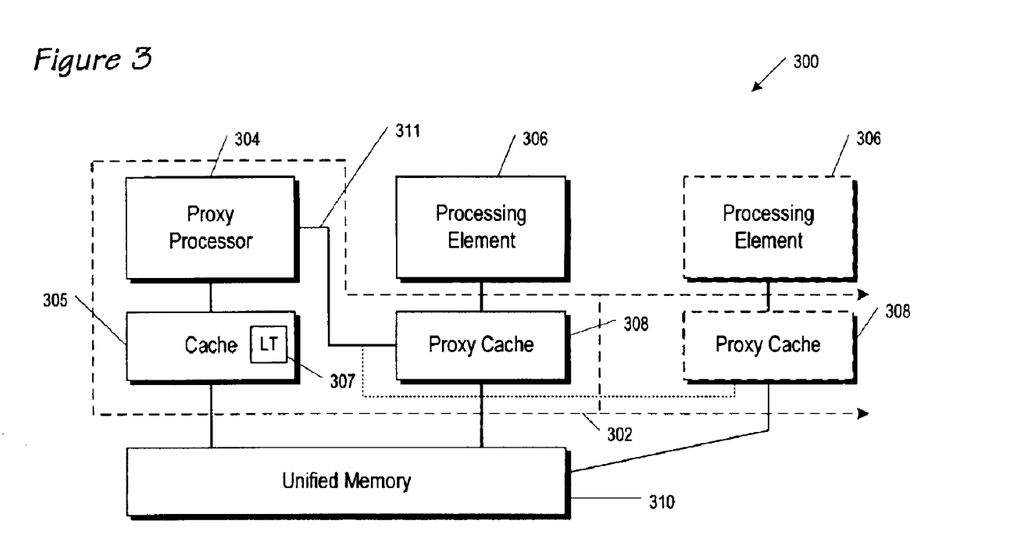
FIG. 3 is a block diagram of a proxy cache management system according to the present invention.

Referring now to FIG. 3, a block diagram 300 is shown of a proxy management system 302 according to the present invention. The proxy management system 302 includes a proxy processor 304 coupled to a cache 305, which is configured to store instructions/data for the proxy processor 304. The cache 305 is coupled to a unified memory 310. Additional processing elements (PE) 306 are also provided, which are coupled to one or more associated proxy caches 308, which in turn are coupled to both the proxy processor 304 via command lines 311, and the unified memory 310. One skilled in the art will appreciate that a number of processing elements 306 (such as vector processors, graphics processors, digital signal processors, etc.,) running the same or different instruction sets are indicated by the processing elements 306.

The proxy processor 304 is used to execute general system management instructions (operating system instructions) for the system-on-a-chip (SoC) that includes the processing elements 306 and the proxy caches 308. In addition, it implements proxy management software procedures to control the proxy caches 308. Such procedures include: flush; lock; migrate; initialize; prefetch; invalidate; set value; etc, for the proxy caches 308 coupled to the processing elements 306. Thus, the proxy processor 304 executes proxy instructions that specify: 1) which proxy cache 308 is targeted; 2) what operation is to be performed; and 3) what physical/virtual addresses are to be affected.

In one embodiment, coherency between the proxy caches 308 is maintained by software algorithms that execute on the proxy processor 304 as part of the operating system. For example, if a first processing element 306 wished to transfer a block of data to a second processing element 306, the operating system executing on the proxy processor would mediate the transfer. That is, the proxy processor 304 would know which data in the proxy cache 308 (associated with the first proxy element 308) would be "dirty" and need to be written back to the unified memory 310 before transfer to the second proxy element 308. In addition, the proxy processor 304 would know whether any "stale" data in the proxy cache 308 (associated with the second processing element 306) would need to be invalidated before the ownership of the data block could be transferred. The proxy processor 304 therefore sends commands to the proxy caches 308, such as flush, invalidate, etc. on command lines 311 to the proxy cache 308 requiring proxy management. The proxy cache 308 receiving the commands performs the desired function and notifies the proxy processor 304 upon completion. Thus, from the viewpoint of any one of the processing elements 306, memory requests to the unified memory 310, and thus to their associated proxy caches 308, are transparently managed by the proxy processor 304, without requiring either the processing elements 306, or their associated proxy caches 308 to insure coherency between the proxy caches 308. Such proxy management, as described above, provides a significant design advantage, because it allows a designer of an SoC to utilize existing heterogeneous processing elements 306 whether or not they have been designed to operate together, or to share a unified memory 310. Of course, this proxy management could also be used with a plurality of homogeneous processing elements.

In an alternative embodiment, the proxy processor 304 monitors memory requests from each of the processing elements 306 to their associated proxy caches 308, and maintains a lookup table 307 for each such request. The proxy processor 304 insures that requests made to the same area of memory by different processing elements 306 are not incoherent. Thus, when a processing element 306 performs a memory access request, the address of the request is provided to the associated proxy cache 308, and to the proxy processor 304 for storage in the lookup table 307. The lookup table 307 stores information regarding what addresses are stored in each of the proxy caches 308, as well as information regarding the status of such addresses (e.g. shared, modified, invalid, etc). This allows the proxy processor 304 to insure data coherency across multiple proxy caches 308. In the absence of such a "shadow" cache 305 describing the state of all the proxy caches 308 managed by the proxy processor 304, the need for proxy cache intervention is determined by software algorithms running on the proxy processor 304 as part of the operating system (such as described above in the first embodiment).

By monitoring the allocation and use of memory in the system by the different processing elements 306, and/or by interrogating a set of cache tags in the lookup table 307, and executing proxy instruction such as those mentioned above, the proxy processor 304 effects transparency between the processing elements 306 and the unified memory 310. That is, the proxy processor 304 causes the proxy caches 308, ultimately, to appear as if they were the unified memory 310, even though other processing elements 306 are also accessing the unified memory 310. One skilled in the art will appreciate that such instructions insure coherency of data between multiple proxy caches 308, effecting write-back procedures, etc., as necessary. Further information related to such proxy cache instructions is provided below with reference to FIG. 6.

Figure 4:
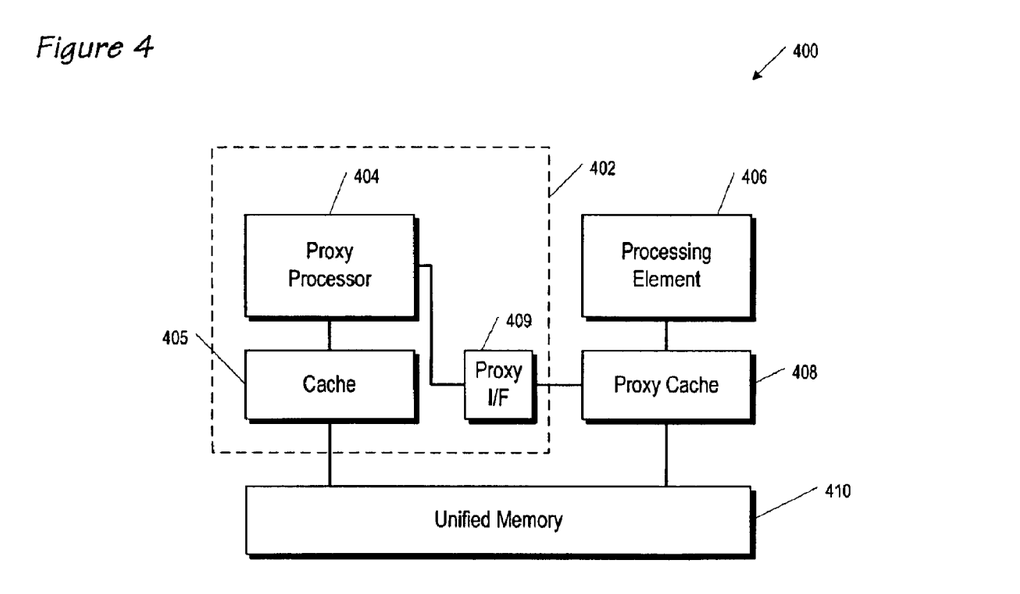
FIG. 4 is a block diagram of an alternative proxy cache management system according to the present invention.

Referring now to FIG. 4, an alternative to the present invention can be implemented by utilizing a processing element specific cache 408 which is coupled to a proxy interface unit 409 between the proxy cache 408 and a proxy processor 404. The proxy interface unit 409 includes the necessary interface (i.e., address/control information) to allow proxy commands to be transferred between the proxy processor 404 of the present invention, and a generic proxy cache 408 coupled to an associated generic processing element 406. That is, a proxy cache 408 is provided that has characteristics specific to the needs of the processing element 406. Thus, the present invention allows an SoC designer to utilize proprietary generic proxy caches coupled to processing elements 306 such as is described with reference to FIG. 3, or alternatively to utilize PE-specific proxy caches coupled to processing elements 406, while interfacing to the proxy processor 404 via a well-defined proxy interface 409.

Figure 6:
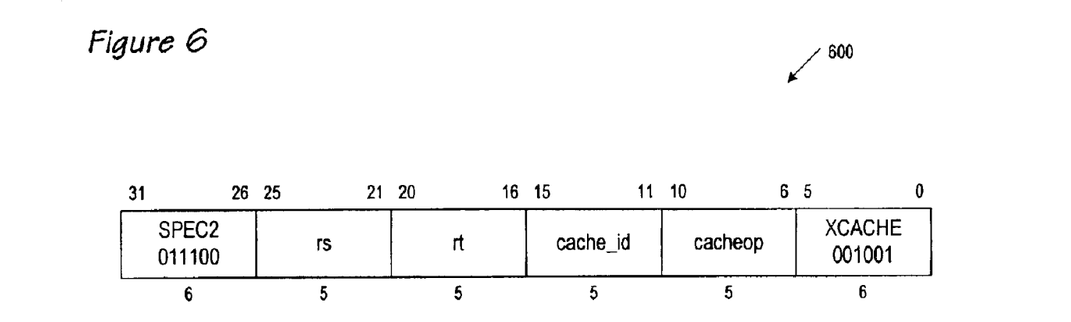
FIG. 6 is a block diagram of a MIPS® architecture instruction for proxy management of multi-cache memory systems. MIPS is a trademark of MIPS Technologies, Inc., Mountain View, Calif.

Referring now to FIG. 6, a block diagram 600 is provided of an instruction format for execution on the proxy processor 304 described above. The instruction is designated XCACHE and is used within the MIPS instruction architecture, although a similar instruction is envisioned for other architectures. The address for a proxy cache operation is generated by adding the contents of general purpose registers rs and rt. The cache_id field identifies which proxy cache is targeted. In one embodiment, an all ones value in the cache_id field would indicate that the instruction is directed at all proxy cache controllers. The cacheop field indicates which cache operation is to be performed: prefetch, lock, write-back/invalidate, discard, etc. Execution of the instruction causes the address and requested cache operation to be communicated to the proxy cache identified by the instruction.

The XCACHE instruction 600 described above allows for 32 different proxy caches to be targeted, and allows for 32 distinct cache commands. One skilled in the art will appreciate that within the XCACHE instruction, one could increase the range of one of those parameters at the expense of the other. However, in alternative architectures, less or more commands/targets may be provided for.

Proxy Virtual Memory Management

A system wide virtual memory scheme is considered beneficial in a unified memory SoC system for several reasons. First, having all processing elements working on the same unified memory implies that, without some form of memory management, one processing element can corrupt the storage being used by another processing element. Second, some form of memory allocation scheme is desirable that can dynamically allocate the shared memory between the processing elements. A paged virtual memory system is considered appropriate because it can reduce or eliminate problems of memory fragmentation, and allow forms of demand paging. Third, by placing a virtual memory structure between a processing element and memory, the effective addressing range can be expanded for a processing element with a constrained logical/physical address space. The amount of memory addressable at any one time remains the same, but by changing the virtual memory mapping underneath the native logical/physical address space, that constrained address space can be made into a changeable "window" into a larger memory.

Most processing elements are specialized computational devices that do not have any means of managing a "page fault" or TLB miss. As with the proxy caches, the present invention uses a combination of a proxy processor, and software executing on the proxy processor to provide and manage an MMU on behalf of heterogeneous processing elements, in a manner that are transparent to the software executing on the heterogeneous processing elements.

Figure 5:
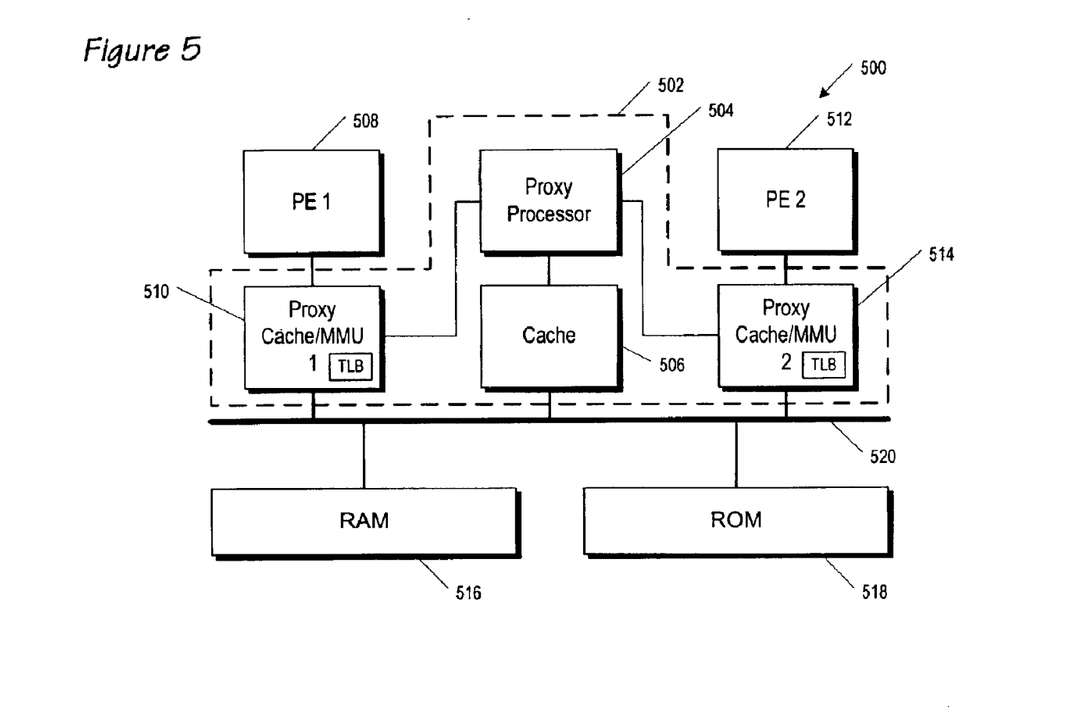
FIG. 5 is a block diagram of a proxy virtual memory management system within a multiprocessing system according to the present invention.

Referring to FIG. 5, a block diagram 500 is shown that illustrates a proxy virtual memory management system 502 according to the present invention. The system 502 includes a proxy processor 504 coupled to its cache 506, which is coupled to RAM 516 and ROM 518 via memory bus 520. The proxy processor 504 is also coupled to a proxy cache/MMU 510 and a proxy cache/MMU 514, associated with processing elements 508 and 512, respectively. In one embodiment, the processing elements 508, 512 do not execute the same instructions, but utilize the RAM 516 and ROM 518 as if they were attached to each directly.

To accomplish this, the processing elements 508, 512 are connected, not directly to the RAM 516 and ROM 51B, but rather, to the proxy cache/MMU units 510, 514. In one embodiment, the units 510, 514 are TLB based; translating the logical addresses provided by the processing elements 508, 512 into physical addresses for interfacing to the unified memory system RAM 516 and ROM 518.

Figure 7:
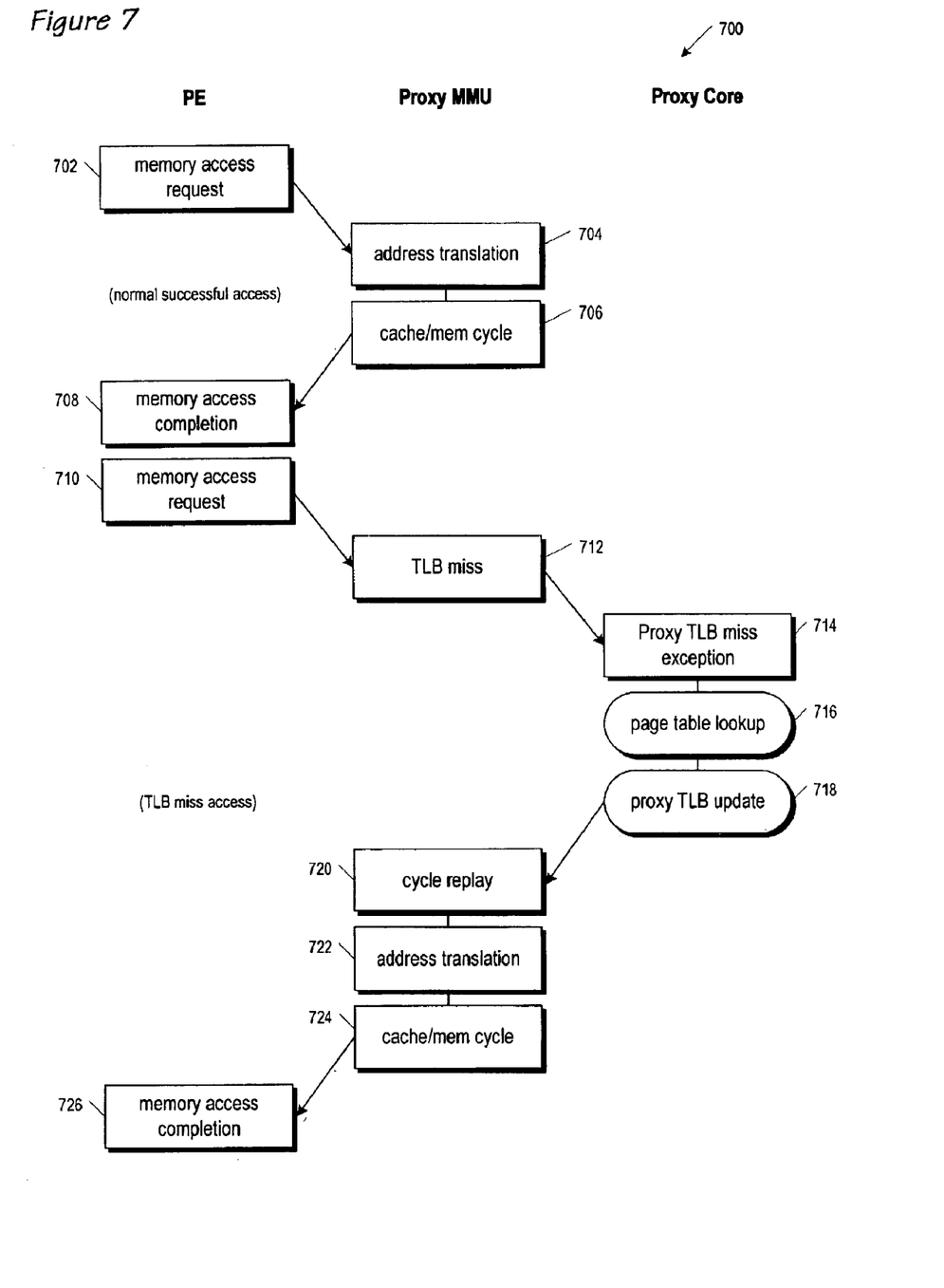
FIG. 7 is a flow chart illustrating the proxy TLB management system according to the present invention.

Referring now to FIG. 7, a flow chart 700 is shown illustrating the methodology of the proxy virtual memory system illustrating in FIG. 5. Flow begins a block 702 when a memory access request is made by one of the processing elements 508, 512. Flow then proceeds to block 704.

At block 704, the proxy cache/MMU unit 510, 514 that is associated with the processing element 508, 512 making the request, translates the logical address presented by the processing element 508, 512 into a physical address. In one embodiment, the address translation step is performed utilizing the logical address to index into a TLB within the proxy cache/MMU unit 510, 514. If the TLB contains a corresponding physical address, a TLB "hit" occurs, and flow proceeds to block 706.

At block 706, the proxy cache/MMU 510, 514 performs a memory cycle with either the RAM 516 or ROM 518 depending on the physical address of the access. Flow then proceeds to block 708.

At block 708, the memory access is completed.

At block 710, another memory access is made by one of the processing elements 508, 512. Flow then proceeds to block 712.

At block 712, the proxy cache/MMU 510, 514 associated with the processing element making the request utilizes the virtual address to index into its TLB. However, for this access, the associated physical address is not in the TLB, i.e., a TLB "miss" occurs. Flow then proceeds to block 714.

At block 714, the proxy cache/MMU 510, 514 generates a proxy TLB miss exception to the proxy processor 504. Flow then proceeds to block 716.

At block 716, the proxy processor executes instructions to perform a page table lookup for the processing element virtual address that caused the TLB miss. The new TLB entry is loaded by the proxy processor 504 from the page table in memory corresponding to the current virtual address mapping of the PE 508 or 512. Flow then proceeds to block 718.

At block 718, the TLB in the proxy cache/MMU 510, 514 that generated the exception is updated by a write operation of the proxy processor 504. Flow then proceeds to block 720.

At block 720, the memory access request from block 710 is replayed in the proxy cache/MMU 510, 514. Flow then proceeds to block 722.

At block 722, translation of the virtual address occurs, this time successfully because the proxy processor 504 has updated the table in the TLB. Flow then proceeds to block 724.

At block 724, the memory cycle is performed by the proxy cache/MMU 510, 514. Flow then proceeds to block 726.

At block 726, the memory access is completed.

In one embodiment, the present invention utilizes a combination of hardware and software to perform the proxy virtual memory management. Tasks performed by hardware are shown as rectangles in FIG. 7. Tasks performed by software are shown as ellipses in FIG. 7.

Figure 8:
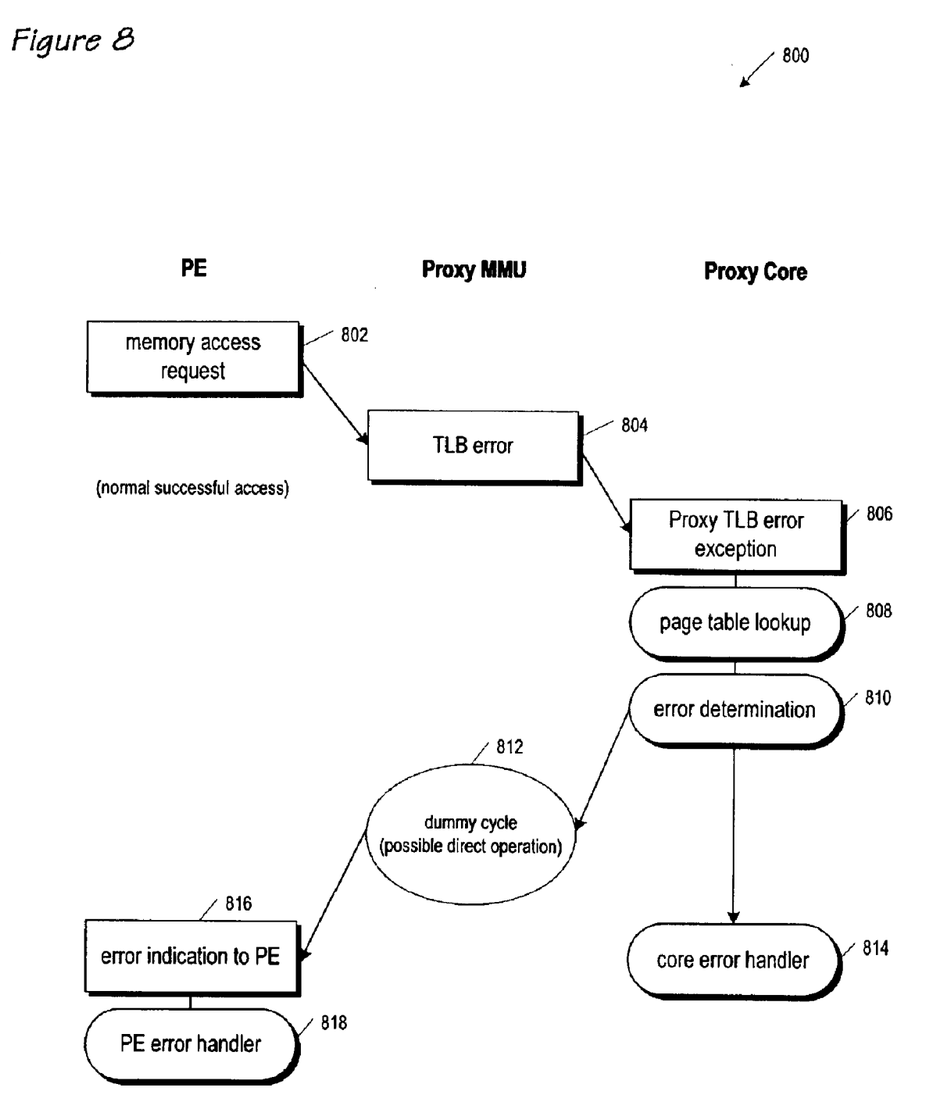
FIG. 8 is a flow chart illustrating the proxy TLB management system during a TLB error, according to the present invention.

Referring now to FIG. 8, a block diagram 800 is shown illustrating the sequence of operations that are performed within the present invention when an illegal memory access, such as an attempt to write to a read-only memory page, is made by a processing element. Flow begins at block 802 when a processing element performs a memory access request. Flow then proceeds to block 804.

At block 804, the proxy cache/MMU, associated with the processing element making the request, looks up the virtual address in its TLB. Since the address is illegal, a TLB error occurs, causing flow to proceed to block 806.

At block 806, the proxy cache/MMU generates an exception to the proxy processor 504. Flow then proceeds to block 808.

At block 808, the proxy processor 504 causes a page table lookup to occur for the virtual address. Flow then proceeds to block 810.

At block 810, the proxy processor confirms that the virtual address of the request is illegal for the processing element making the request. Flow then proceeds to blocks 814 and 812.

At block 812, the illegal memory cycle requested by the PE must be aborted. Depending on the design of the PE, it may be necessary to provide the PE's memory interface logic with a "dummy" cycle handshake, or it may be possible to present it with a bus error or other memory access exception that will abort the suspended access. Flow then proceeds to block 816.

At block 814, the proxy processor executes an error handler routine which triggers whatever global operating system level "housekeeping" needs to be done in response to the error. This may include signaling an exception to the processing element making the request, resetting the PE, and communicating the fact of a failure to other PE's in the system. In more sophisticated PE's, an interrupt may be generated to cause the PE to execute error management procedures and resume operation.

At block 816, the processing element receives the error indication. Flow then proceeds to block 818.

At block 818, the processing element executes an error handler that has been written to deal with illegal memory requests.

The above description with reference to FIGS. 3–8 have illustrated alternative embodiments and a method for providing a proxy cache system, and a proxy memory management system for use in a multiprocessor environment. Although the present invention and its objects, features, and advantages have been described in detail, other embodiments are encompassed by the invention. In addition to implementations of the invention using hardware, the invention can be embodied in computer readable program code (e.g., software) disposed, for example, in a computer usable (e.g., readable) medium configured to store the code. The code causes the enablement of the functions, fabrication, modeling, simulation and/or testing, of the invention disclosed herein. For example, this can be accomplished through the use of computer readable program code in the form of general programming languages (e.g., C, C++, etc.), GDSII, hardware description languages (HDL) including Verilog HDL, VHDL, AHDL (Altera Hardware Description Language) and so on, or other databases, programming and/or circuit (i.e., schematic) capture tools available in the art. The code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a processor that is embodied in code (e.g., HDL, GDSII, etc.) and may be transformed to hardware as part of the production of integrated circuits. Also, the invention may be embodied as a combination of hardware and code.

Moreover, although the present invention has been described with reference to particular apparatus and method, other alternative embodiments may used without departing from the scope of the invention. For example, many variants are possible on the encoding and operational description above. For example, two registers are described to compute the address to be affected in the proxy cache, but none are used to return any information from the proxy cache/MMU. If some form of synchronization were needed, or if some kind of remote cache/MMU interrogation were desired, one of the GPR specifier fields could be used to indicate a destination register for data or status to be returned by the operation. Also, a number of programming interfaces to the proxy TLB are possible. It could be treated as an I/O device responding to a set of proxy processor memory addresses, as a separate coprocessor, or as an extension of the existing MIPS system coprocessor (i.e., COPO).

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. An apparatus for proxy management of a plurality of intermediate memories associated with a plurality of heterogeneous processing elements executing different instruction sets, the plurality of heterogeneous processing elements not utilizing their own coherency mechanisms, the processing elements sharing a unified memory, the apparatus comprising:
   a proxy processor, independent from the plurality of heterogeneous processing elements, said proxy processor coupled to the plurality of intermediate memories, for executing proxy management instructions upon a TLB miss in one of the plurality of intermediate memories, to manage the plurality of intermediate memories and insure coherency between the plurality of intermediate memories associated with the plurality of heterogeneous processing elements; and
   a first plurality of intermediate memories associated with a first plurality of processing elements, the first plurality of intermediate memories being designed to interface to said proxy processor;
   at least one intermediate memory which is not designed to interface to said proxy processor; and
   an interface between said at least one intermediate memory and said proxy processor;
   wherein said proxy processor monitors memory use among said first plurality of processing elements, and said at least one intermediate memory, and executes said proxy management instructions to effect transparency between the plurality of processing elements and the unified memory.

2. The apparatus for proxy management as recited in claim 1 wherein the plurality of intermediate memories comprises a plurality of cache memories.

3. The apparatus for proxy management as recited in claim 2 wherein each of the plurality of processing elements is associated with at least one of the plurality of cache memories.

4. The apparatus for proxy management as recited in claim 1 wherein the plurality of processing elements comprises processing cores.

5. The apparatus for proxy management as recited in claim 4 wherein said processing cores comprise: digital signal processors; and graphics processors.

6. The apparatus for proxy management as recited in claim 1 wherein the unified memory comprises random-access-memory (RAM).

7. The apparatus for proxy management as recited in claim 6 wherein the unified memory further comprises read-only-memory (ROM).

8. The apparatus for proxy management as recited in claim 1 wherein the proxy processor comprises a RISC microprocessor core having a cache, for storing the proxy management instructions.

9. The apparatus for proxy management as recited in claim 1 wherein the apparatus resides within a system-on-chip (SoC) environment.

10. The apparatus for proxy management as recited in claim 1 wherein said proxy processor is coupled to each of said plurality of intermediate memories to receive addresses of memory requests generated by the plurality of processing elements.

11. The apparatus for proxy management as recited in claim 10 wherein said proxy processor determines whether said received addresses are present in any other of said plurality of intermediate memories.

12. The apparatus for proxy management as recited in claim 11 wherein if said proxy processor determines that said received addresses are present in any other of the plurality of intermediate memories, said proxy processor executes said proxy management instructions to insure coherency of data at said received addresses.

13. The apparatus for proxy management as recited in claim 12 wherein said instructions comprise:
    a write-back instruction for said any other of the plurality of intermediate memories that contain data at said received address; and
    a prefetch instruction to load data at said received address from the unified memory into said intermediate memory associated one of the plurality of processing elements that generated said memory request.

14. The apparatus for proxy management as recited in claim 12 wherein said instructions comprise:
    an invalidate instruction for said any other of the plurality of intermediate memories that contain data at said received address.

15. The apparatus for proxy management as recited in claim 12 wherein said instructions comprise:
    a write-back instruction for said any other of the plurality of intermediate memories that contain data at said received address.

16. The apparatus for proxy management as recited in claim 12 wherein said instructions comprise:
a prefetch instruction for said any other of the plurality of intermediate memories that contain data at said received address.

17. The apparatus for proxy management as recited in claim 1 wherein said proxy cache comprises a lookup table that stores a plurality of address information for all data stored in the plurality of intermediate memories.

18. The apparatus for proxy management as recited in claim 17 wherein said lookup table further stores coherency information such as shared, modified, invalid indicators for each of said plurality of address information.

19. A proxy management system within a computing environment, the environment having a plurality of processing elements, the plurality of processing elements not utilizing their own coherency mechanisms, the proxy management system comprising:
a first at least one proxy cache, coupled to a first associated one of the plurality of processing elements, for storing instructions/data for use by said first associated one of the plurality of processing elements;
a second at least one proxy cache, coupled to a second associated one of the plurality of processing elements, for storing instructions/data for use by said second associated one of the plurality of processing elements; and
a proxy processor, independent from the plurality of processing elements, and executing its own proxy instructions, coupled to said first and second at least one of proxy caches, for managing coherency between said proxy caches;
wherein said second at least one proxy cache is not designed to interface to said proxy processor; and
an interface between said second at least one proxy cache and said proxy processor;
wherein said proxy processor monitors memory use among said first at least one and second at least one proxy caches, and executes said proxy instructions to effect transparency between the plurality of processing elements and the unified memory.

20. The proxy management system as recited in claim 19 wherein the plurality of processing elements comprise microprocessor cores for use within a system-on-a-chip environment.

21. The proxy management system as recited in claim 19 wherein the plurality of processing elements are heterogeneous.

22. The proxy management system as recited in claim 19 wherein at least two of the plurality of processing elements execute different instruction set architectures.

23. The proxy management system as recited in claim 19 wherein said proxy processor comprises a MIPS RISC processing core.

24. The proxy management system as recited in claim 19 wherein said memory requests comprise memory reads and memory writes.

25. The proxy management system as recited in claim 19 wherein said proxy processor determines that one of said proxy caches requires management by examining a request by one of the processing elements to transfer a block of data to another one of the processing elements.

26. The proxy management system as recited in claim 19 wherein said proxy management instructions comprise instructions to: flush; invalidate; and prefetch data from/to said one of said plurality of proxy caches.

27. The proxy management system as recited in claim 19 wherein said proxy processor is coupled to each of the plurality of caches via a proxy interface.

28. The proxy management system as recited in claim 27 wherein said proxy interface allows each of said plurality of caches to be designed without regard to interfacing to said proxy processor.

29. A proxy management method to allow a plurality of processing elements to utilize generic caches which do not have their own coherency mechanism between the plurality of processing elements and a unified memory, the method comprising:
providing a proxy processor, independent from the plurality of processing elements, and executing its own proxy management instructions, for interfacing to each of the generic caches;
monitoring ownership transfer of a memory block generated by the plurality of processing elements;
determining whether any of the ownership transfers are directed to an address that is stored in one or more of the generic caches; and if so,
executing proxy management instructions to insure coherency between the generic caches.

30. The method as recited in claim 29 wherein the proxy processor is coupled to each of the generic caches.

31. The method as recited in claim 30 wherein said step of monitoring comprises executing operating system instructions that are utilized during the ownership transfers.

32. The method as recited in claim 29 wherein said step of determining comprises:
examining a cache to look up whether the ownership transfers correspond to data in any other of the dedicated caches.

33. The method as recited in claim 29 wherein said step of executing comprises:
invalidating data in one of the generic caches;
writing data in one of the generic caches back to the unified memory; and
pre-fetching the data written in unified memory into one of the generic caches.

34. A computer program product for use with a computing device, the computer program product comprising:
a computer usable medium, having computer readable program code embodied in said medium, for causing a proxy management system to be described, the proxy management system having a plurality of intermediate memories associated with a plurality of processing elements, the processing elements sharing a unified memory, said computer readable program code comprising:
first program code for providing a proxy processor, independent from the plurality of processing elements, for executing proxy management instructions to manage the plurality of intermediate memories; and
second program code for providing a cache for storing the proxy management instructions;
wherein said proxy processor monitors ownership transfers from the plurality of processing elements, and executes the proxy management instructions to the plurality of intermediate memories to effect coherency between the plurality of processing intermediate memories and the unified memory.

35. The computer program product as recited in claim 34 wherein the plurality of intermediate memories comprises a plurality of cache memories.

36. The computer program product as recited in claim 34 wherein the plurality of processing elements comprises: digital signal processors and graphics processors.

* * * * *